United States Patent
Buonocunto

[11] Patent Number: 5,808,421
[45] Date of Patent: Sep. 15, 1998

[54] BALLAST CIRCUIT HAVING DUAL VOLTAGE SOURCE AND EMERGENCY BATTERY

[76] Inventor: Nicholas Buonocunto, 31 Ogden Ave., White Plains, N.Y. 10605

[21] Appl. No.: 790,742

[22] Filed: Jan. 27, 1997

Related U.S. Application Data

[63] Continuation-in-part of Ser. No. 500,339, Jul. 10, 1995, abandoned, which is a continuation-in-part of Ser. No. 219,038, Mar. 28, 1994, abandoned.

[51] Int. Cl.⁶ .................................................. H05B 37/00
[52] U.S. Cl. ............................. 315/219; 315/86; 307/130
[58] Field of Search ..................................... 307/130, 112, 307/131, 125, 64, 65, 66, 80, 85, 86; 315/86, 87, 209 R, 201, 206, 210, 224, 219, 276, 277, 291

[56] References Cited

U.S. PATENT DOCUMENTS 5,512,801   4/1996   Nilssen ................................ 315/209 R

*Primary Examiner*—Robert J. Pascal
*Assistant Examiner*—David H. Vu

[57] ABSTRACT

A circuit is provided for energizing one or more discharge lamps. The circuit is capable of being powered from one or two alternative AC voltage and comprises a transformer having a common first tap, a second tap and a third tap, and a dual voltage means which accepts power from a pair of AC source lines. The dual voltage circuit connects the AC source lines to either the first common first tap and the second tap, if the voltage is at the first AC voltage, or to the common tap and the third tap if the voltage is at the second AC voltage.

24 Claims, 2 Drawing Sheets

BALLAST CIRCUIT HAVING DUAL VOLTAGE SOURCE AND EMERGENCY BATTERY

RELATED APPLICATIONS

This application is a continuation-in-part of application Ser. No. 08/500,339 filed Jul. 10, 1995, abandoned, which is, in turn, a continuation-in-part of application Ser. No. 08/219,038 filed Mar. 28, 1994, which is now abandoned.

FIELD OF THE INVENTION

This invention relates to ballast circuits and is particularly related to a ballast circuit for operating one or more discharge lamps. More specifically, the present invention relates to a novel ballast circuit which is capable of being powered from one of two alternative AC voltage for operating one or more discharge lamps, such as fluorescent lamps.

BACKGROUND OF THE INVENTION

Ballast circuits for discharge lamps, such as fluorescent lighting systems are well known in the industry.

Ballasts and ballasting techniques have been described in several patents. Examples of such patents include U.S. Pat. Nos. 4,117,377 (Jimerson et al.); 4,320,325 (Anderson); 4,300,736 (Perper); 4,437,042 (Morais et al.); 4,378,514 (Collins); 4,463,286 (Justice); and 4,484,109 (Buser). These patents describe heavy inductive ballasts or ballasts which require a substantial number of components, and therefore reduce the reliability of the ballasts while increasing maintenance requirements and costs.

Attempts have been made to overcome the problems associated with ballasts of the type described in said patents. For example, U.S. Pat. No. 4,418,917 issued to Gary W. Vest describes an electronic ballast circuit for fluorescent lamps which is lightweight, compact and utilizes fewer components.

Other ballasting circuits are described in the more recent U.S. Pat. Nos. 4,972,126 and 4,985,664, both issued to Ole K. Nilseen.

Nostwick U.S. Pat. No. 5,063,331, in FIG. 1 shows two lamps 90 and a ballast circuit which is connected in series with these lamps. It does not disclose in the description relating to this figure, how a single 8 foot lamp can be energized. In FIG. 1, both lamps 90 are energized, in series, and when one lamp goes off, the other lamp goes off as well. Nostwick's ballast circuitry is not designed to energize one lamp alone nor to keep one lamp illuminated if the other lamp goes out.

Nostwick in FIG. 2 discloses a circuitry which is basically similar to FIG. 1 and is used to energize two lamps 144 and a ballast circuit which is connected in series with the two lamps, as is clearly shown by following the electrical path through line 148 and series connected connectors 150. Thus, once again, if one of the lamps 144 goes off, so will the other lamp. As in the circuit in FIG. 1, the ballast circuit in FIG. 2 is not designed to energize a single 8 foot lamp if a pair of lamps is used. Nostwick will only work with a pair of 8 foot lamps not with a single lamp or a lower wattage lamp or lamps.

Notwithstanding many attempts to improve the ballasting circuit, many currently available ballasts are limited in their use in that they are only used for powering fluorescent light lamps which are 2, 3, or 4 feet long. The use of 8 foot long fluorescent lamps is desirable in industrial and commercial establishments. At the present, two ballasts are also used to power and energize such longer fluorescent lamps. This of course results in increased energy consumption, more difficulties in maintenance and added costs of operation. Accordingly, there is still a need for further improvements in ballasting techniques and providing a single ballast circuit which can adequately power and energize one or more 8 foot lamps. If one of the lamps should become extinguished, because of age or other reasons, it is desirable that the other lamp should remain illuminated.

Accordingly, it is an object of the present invention to provide an improved ballast for discharge lamps.

It is a further object of this invention to provide a ballast having a circuitry which is capable not only for energizing fluorescent lamps which are 2, 3 or 4 foot long, but which are uniquely designed and therefore capable of energizing two 8 foot long fluorescent lamps.

It is also an object of this invention to provide such improved ballast circuit which is capable of being powered by one or two alternative AC voltage source for operating one or more discharge lamps, such as fluorescent lamps.

It is yet another object of the present invention to provide such a ballast which is conventional in its outside mounting configuration so that it may be mounted in conventional fluorescent lamp housings.

The foregoing and other objects and features of the present invention will be appreciated and understood from the ensuing detailed description of the invention and the accompanying drawing.

SUMMARY OF THE INVENTION

The present invention provides a ballast circuit to operate one, or a series, of discharge lamps. For example, it may operate a series of 8-foot long fluorescent bulbs, including mixed lamps of U.S. and European types and mixed lamps of different ratings and lengths.

The ballast circuit has a dual input means which accepts AC voltages at two different voltages, for example, 110 VAC (Volts Alternating Current) and 277 VAC (in the U.S.) or 220 VAC and 380 VAC (Europe). That input circuit has a Zener diode, a pair of triacs and a transformer (low frequency, "first transformer") having a first (common) tap, a second (center) tap and a third (top) tap. When the input voltage is low (100 VAC—US or 220 VAC—Europe) the operative connection is only to one triac, the common tap and the center tap. When the voltage is higher (277 VAC—US or 380 VAC—Europe) then, automatically the operative connection to the AC input lines is made to the other triac, the common tap and the top tap.

The secondary of the first (low frequency) transformer is connected to a battery charging circuit which charges a rechargeable dry cell, for example, a Ni—Cd (Nickel-Cadmium) 12-Volt DC Battery. If the AC power should fail, a normally relay is closed connecting the battery to power the lamps for normal operation of a switch which is closed manually. The battery charger includes a full-wave diode bridge circuit, a Zener diode and a transistor.

The same DC (Direct Current) power output of the battery charging circuit is used to charge the battery and to power the lamps, when the AC power is on. It powers a high frequency IC (Integrated Circuit) oscillator whose frequency is in the 100 KHz range, varying from about 50 to about 200 KHz. The oscillator is connected to a digital counter whose output added pulses. The pulses are at an 80% duty cycle, to provide rest periods for the second transformer, which is a high frequency transformer. That output transformer is driven by two power transistors, which are MOSFETs (Metal Oxide Field Effect Transistor) controlled by the digital counter. The secondary of the second transformer is connected to pairs of electrodes and a discharge lamp fits between each pair of electrodes.

This ballast is designed to be used as a normal, but flicker-free and instant-starter fluorescent light unit. It can also be used as an emergency light with the addition of rechargeable batteries. The ballast uses lower voltage 12 VDC (Volts Direct Current) instead of rectified AC current, for example, at 110 VAC. This provides the following advantages:
1. The unit can be used as an emergency light, for hours, if necessary, depending on the capacity of the battery.
2. Because it is powered at low-voltage (12 VDC) inexpensive "normal" transistors are used for the inverter; instead of expensive multi-diffused high-voltage (tension) types, which would be used in a rectified AC ballast circuit.
3. The IC (Integrated Circuit) is directly fed by 12 VDC and 5 VDC which derver from the 12 VDC.
4. RFI (Radio Frequency Interference) coming from the inverter is sufficiently suppressed by the large capacity of the battery and/or condenser; without requiring additional filters.
5. Galvanic separation from the AC supply is less hazardous if the lamps must be kept lighted during repair or maintenance.

The final stage operates at high frequency (over 5 K Hz), which has the following advantages over the commonly used 50 Hz or 60 Hz ballasts:
1. No visible flicker.
2. No need for heat-up, since a reliable cold start can be achieved.
3. Instant start-up, even at low temperatures.
4. Uses at least 30% less energy for the same brightness than in 50/60 Hz operation.

The present ballast uses piloted (controlled) power transistors (MOSFETs) which are exactly controlled by a digital control circuit (digital counter). This has the following several advantages over a self-oscillating multivibrator.
1. No simultaneous conduction is possible as in AC source rectified circuits with artificial center.
2. Transistors (MOSFETs) can be controlled separately with dead-time in between duty cycles to ensure an efficient operation of the output transformer.
3. In case of abnormal operation of the final transistor stage (MOSFET) they can easily be switched off by means of PROTECTIVE circuitry.

DETAILED DESCRIPTION

Figure 1:
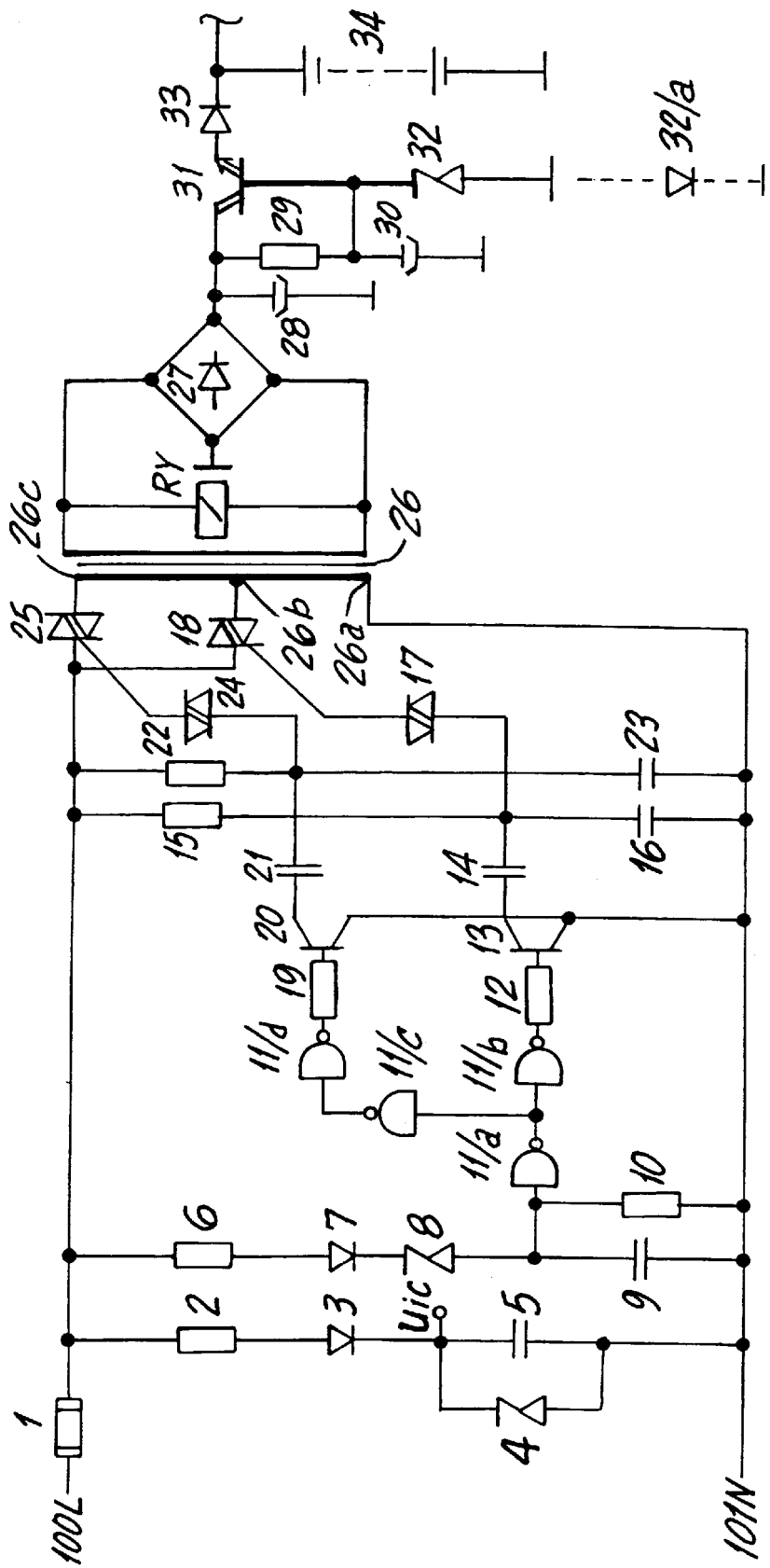
FIG. 1 is a schematic diagram of the circuitry of the ballast of the present invention.
Figure 1:
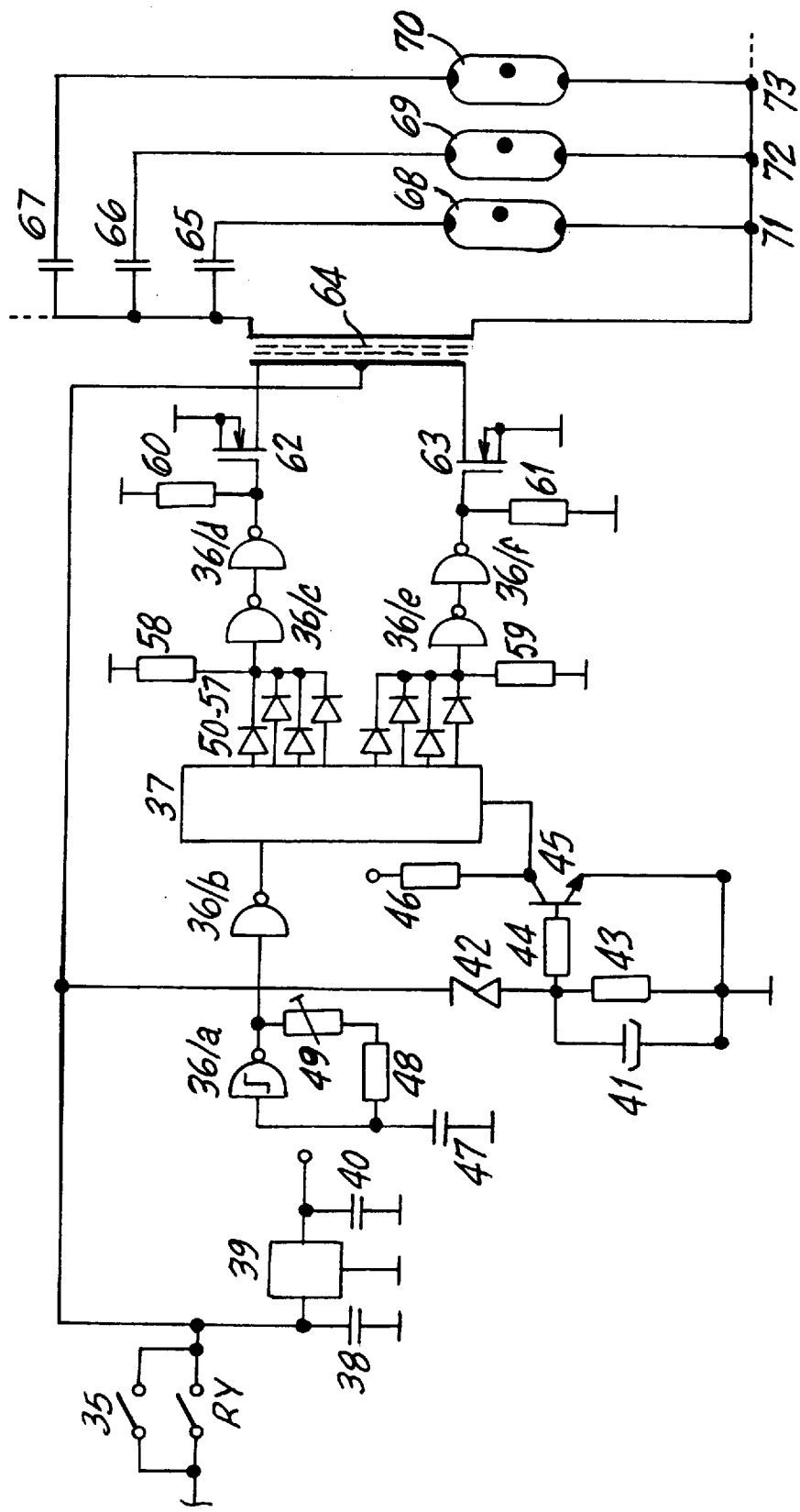

The input supply circuit A for the ballast consists of a pair of controlled (piloted) triacs 18 and 25 which will automatically transfer to one of the two input voltages, in this case 110 VAC and 277 VAC (in Europe 220/380 VAC). There is at least a 100-volt difference between the two alternative voltages.

A conventional transformer 26 has been chosen rather than a switching power supply, which requires greater volume when used with high-wattage resistors (up to 38 watts). Such a switched power supply would be a source of unwanted heat (radio frequency interference) and thus waste of energy.

At the moment of connecting the ballast to the AC source 100 L and 101 N (pair or power lines) which is protected by fuse 1 input supply circuit A switches itself to the appropriate tap of the transformer 26. The transformer 26 (first transformer has a first (common) tap 26a, a center tap 26b and an end tap 26c. If the AC source 100, 101 is at 110 VAC (Volts Alternating Current) the voltage across R 6, diode 7 will not conduct a higher voltage than the voltage limited by Zener diode 8. Capacitor 9 may be provided to smooth the sensing voltage.

Thus, the IC 11a will have an L-level caused by R10. This L-Level is twice inverted by IC 11/a and 11/b and appears on R12. Transistor 13 will not conduct thus allowing C16 to be charged by R15. In this manner, electricity will be conducted through Triac 17 and Triac 18, and therefore is connected to the center-tap of the Transformer 26.

At the same time the IC 11/c receives an H-Level from the output of IC 11/a, twice inverted via IC 11/c and 11/d. This H-Level will conduct Transistor 20 via R19; in this case C23 will never be charged by R22, since C21 inhibits this by being 100 times larger than C23. As a consequence Diac 24 and hence Triac 25 will not conduct.

If electricity is passing through, the higher voltage will be connected, IC 11/a will receive an H-Level, (R10 is not anymore sufficient to keep the input to L-Level) twice inverted; this H-Level will pass through IC 11/d and IC 11/b, conduct Transistor 13 through R12. C14 has a 100 times greater capacity over C16, in this case charging the latter by R15 is not possible. As a consequence, Diac 17 and hence Triac 18 will not conduct. At the same moment, an L-Level which comes from the output of IC 11/a will be inverted twice through IC 11/c and IC 11/d thus not conducting Transistor 20, allowing C23 to be charged by R22 and through Diac 24 the Triac 25 conducts over nearly 360° Live into 26C.

The IC 11, whose gates are 11/a, 11/b. 11/c and 11/d is supplied via R2, rectified by diode 3, smoothened by C5 and voltage stabilized by the Zener diode 4. This is indicated by Uic (the suply voltage of the IC).

Using a conventional transformer 26 the RFI (Radio Frequency Interference) coming from the inverter (discussed below) will sufficiently be suppressed by the capacitor 28 and the battery 34. There will be no need for further filters except to filter out what is left from the RFI in difficult environments (not shown).

The battery charger B is straightforward and does not use expensive components. The four-diode bridge 27 full-wave rectifies the AC from the transformer 26 secondary. Capacitor 28 smoothens down the ripple and the Darlington-transistor 31 stabilizes the voltage (tension) with the aid of the Zener diode 32 to be in the range of about 14.3 Volts (DC). There is a biasing resistor 29 for the stabilizing circuit and a capacitor 30 to smoothen the Zener voltage. There will be about 14.3 Volts applied to the battery 34 across diode 33, which prevents a flow-back in case of AC source failure. In case of Zener diode 32 is too low in tolerance (stray-value of production) a diode 32/a can be added to step up to the voltage for another 0.6 to 0.7 Volts. In this case the battery will always be charged.

The + pole of the battery 34 goes to the wall-switch 35 and the inverter can be activated by switch 35. Also a relay RY can be added in case the light must be switched on automatically during a blackout.

An electronic clock circuit C can also be added to avoid a discharge of the battery at AC failure during the night when no one is at the school, office or other location. A 5 volt stabilizer 39 with associated capacitors 38 and 40 are provided to supply IC 36 and IC 37. This circuit also has a battery-sensor to avoid a complete discharge of the battery in case of a prolonged black-out, which will exceed the capacity of the battery. Below 8.2 Volts at the battery the Master-reset of the decimal-counter 37 will be activated, thus returning to output "0". When that happens the final transistors 62, 63 are not connected, the inverter ceases to work resting in a stand-by position, ready to carry on as soon as the voltage rises again.

Transistor 45 (limited by resistor 44) is provided with associated Zener diode 42 which breaks through at 8.2 Volts (limited by resistor 43) with capacitor 41 in parallel as smoothing and delaying capacitor. Transistor 45 conducts at a sensed voltage above 8.2 Volts thus keeping the Master-Reset of IC 37 to Low, to enable IC 37 to count. However, if Transistor 45 does not conduct because of lack of sensed voltage, the Master-Reset of IC37 will be pulled via Resistor 46 to High-level and resets IC 37 to output $Q_0$ whereby none of the two Power-Mos 62–63 will be piloted so that Oscillation will cease.

With the aid of IC 36, the oscillator generates a 10 times higher frequency than that of the output-frequency. The oscillator includes IC 36, C47, R 48 and, for frequency-adjustment, pot (variable resistor) 49 via a buffering-stage the about 100 K Hz impulses from the oscillator are fed into the decimal counter 37. The oscillator has a frequency in the range of about 50 KHz to about 200 KHz. The gates 36/d and 36/f are connected to the gates of MOSFETs 62, 63. The output-frequency of the MOSFETs (of the composed pulses) is in the range of about 5 to about 20 KHz and preferably 10 K Hz. Each composed output pulse is the addition of 8 digital pulses from the decimal counter 37 for a duty cycle in the range of about 70% to about 90% and preferably about 80%. Since output "0" and "5" of counter 37 are not connected to the MOSFETs 62, 63 (power-transistors) a dead time is created. This enables the output transformer 64 to de-magnetize itself at a given time before the oppose MOSFET 62,63 is switched on again. Thus twice a 40% duty-cycle is achieved making a total of 80% of duty cycle while twice 10% (20%) is dedicated to the dead-time. In this case overlapping is impossible allowing each MOSFET 62, 63 to cease switching before the opposite MOSFET transistor is conducting again.

Diodes 50–57 are provided which are adding-diodes to add output $Q_1$ to $Q_4$ for Power-Mos 62, as well as output $Q_6$ to $Q_9$ to pilot Power-Mos 63. Resistors 58–59 which will keep the inputs of IC 36/c and 36/e to Low in absence of the duty-cycle i.e., dead time and opposite cycle. Resistors 60–61 are also provided to ensure low-level for Power-Mos 62 and 63 in absence of an on-cycle from IC 36/d and 36/f to prevent auto-oscillation due to unstable Gate-condition.

Fluorescent lamps 68, 69, 70 or other discharge lamps, are connected to the output-winding of the transformer 64, using electrodes 71, 72, 73, via capacitors 65, 66, 67, to each lamp, limiting the lamp current. In case of failure of one of the lamps, due to age or mechanical break-down, the remaining lamps will not be affected; they continue to illuminate. Also, mixed fluorescent lamps can be mounted, e.g., an 8-foot lamp besides a European type of any wattage provided each lamp will be fed via its own capacitor.

This ballast circuit automatically switches to the correct AC voltage (mains tension) by means of a tapped transformer and two controlled triacs. Only one of the triacs will switch Live (from the AC source) to the appropriate tap of the transformer, i.e., the center tap or end tap. The digital divider 37 connected to the IC oscillator will divide symmetrically, even if the oscillator input is not perfectly 50%. This ensures an effective operation of the output high-frequency transformer as well as an equal share of load to each of the two power transistors (MOSFETs). The circuit ceases to oscillate if the battery is too low by activating the master-reset of a digital divider 37 (decimal divider) with the aid of a voltage sensor to thereby avoid a complete discharge of the battery 34. The fluorescent lamps 68, 69 can be of different length and/or ratings (wattage) and can be connected together by limiting the current of each lamp by a selected chosen capacitor-value 65–67 for each lamp. At a failure of one lamp, e.g., due to age, the remaining lamps will not be affected and will remain illuminating.

What is claimed is:

1. A circuit for operation of at least one discharge lamps, such as fluorescent bulbs, which circuit automatically switches to be powered from one or two alternative AC voltages the circuit comprising:
  (a) a first transformer having a common first tap, a second tap and a third tap,
  (b) a dual voltage means to accept AC power, from a pair of AC source lines, at a first AC voltage and at a second AC voltage which is at least 100 volts higher than the first AC voltage;

wherein the dual voltage circuit means connects the AC source lines to either the common first tap and the second tap if the voltage is at the first AC voltage or the common first tap and the third tap if the voltage is at the second AC voltage.

2. A circuit as in claim 1 wherein the dual voltage means includes a pair of triacs and a Zener diode.

3. A circuit as in claim 1 wherein a DC charging circuit means produces voltage at about 13–15 volts DC.

4. A circuit as in claim 3 wherein the DC charging circuit means includes a full-wave rectifier bridge.

5. A circuit as in claim 3 wherein the DC charging circuit means includes a full-wave rectifier bridge.

6. A circuit as in claim 1 wherein the first AC voltage is 110 volts and the second voltage is 277 volts.

7. A circuit as in claim 1 wherein the dual voltage means includes two Zener diodes connected to the AC source lines and two triacs connected, respectively, to the second and third taps of the first transformer.

8. A circuit as in claim 1 wherein the high frequency oscillator generates pulses in the frequency of about 50 to about 200 KHz and is an integrated circuit.

9. A circuit as in claim 8 wherein the pulse forming means generates pulses in the range of about 8 to about 12 KHz and at a duty cycle of 70%–90%.

10. A circuit as in claim 8 wherein the pulse forming means generates pulses in the range of about 8 to about 12 KHz and at a duty cycle of about 70% to about 90%.

11. A circuit as claimed in claim 1 wherein a battery and battery charging means are provided between said first transformer and said discharge lamps.

12. A circuit as set forth in claim 11 wherein said battery is a dry cell battery and said battery charging means is a DC charging circuit means connected after the first transformer to charge the battery from the AC source and to produce DC voltage in the range of about 6 to about 24 volts.

13. A circuit as set forth in claim 11 wherein an oscillator circuit is connected to said battery and said battery charging means.

14. A circuit as set forth in claim 13 wherein said oscillator is a high-frequency oscillator, whose frequency is from about 50 Khz to about 200 KHz.

15. A circuit as set forth in claim in claim 14 wherein a pulse forming means to generate high frequency pulses at over about 5 KHz and driven by the oscillator.

16. A circuit as set forth in claim 15 wherein a pair of MOSFETs (Metal Oxide Field Effect Transistors) each of which has a control gate driven by the high frequency pulses from the digital pulse forming means.

17. A circuit as set forth in claim 16 wherein a second transformer having a primary coil and a secondary coil, the primary coil being driven by the MOSFETs.

18. A circuit as set forth in claim 17 wherein a pair of electrodes adapted to receive a discharge lamp therebetween and connected to the secondary coil of the second transformer by a capacitor.

19. A circuit for operation of at least one discharge lamps, such as fluorescent bulbs, which circuit automatically switches to be powered from one or two alternative AC voltages or an emergency battery, the circuit comprising:
(a) a first transformer having a common first tap, a second tap and a third tap,
(b) a dual voltage means to accept AC power, from a pair of AC source lines, at a first AC voltage and at a second AC voltage which is at least 100 volts higher than the first AC voltage;
wherein the dual voltage circuit means connects the AC source lines to either the common first tap and the second tap if the voltage is at the first AC voltage or the common tap and the third tap if the voltage is at the second AC voltage;
(c) a dry cell battery;
(d) a DC charging circuit means connected between the first transformer and the battery to charge the battery from the AC source and to produce DC voltage in the range of about 6 to about 24 volts;
(e) a high-frequency oscillator, whose frequency is at least 50 K Hz which is connected to the charging circuit means and the battery;
(f) a pulse forming means to generate high frequency pulses at over about 5 KHz and driven by the oscillator;
(g) a pair of MOSFETs (Metal Oxide Field Effect Transistors) each of which has a control gate driven by the high frequency pulses from the digital pulse forming means;
(h) a second transformer having a primary coil and a secondary coil, the primary coil being driven by the MOSFETs; and
(i) a pair of electrodes adapted to receive a discharge lamp there between and connected to the secondary coil of the second transformer by a capacitor.

20. A circuit as in claim 1 wherein the dual voltage means includes a pair of triacs and a Zener diode.

21. A circuit as in claim 1 wherein the DC charging circuit means produces voltage at about 13 to about 15 volts DC.

22. A circuit as in claim 1 wherein the first AC voltage is 110 volts and the second AC voltage is 277 volts.

23. A circuit as in claim 1 wherein the dual voltage means includes a Zener diode connected to the AC source lines and two triacs connected, respectively, to the second and third taps of the first transformer.

24. A circuit as in claim 1 wherein the high frequency oscillator generates pulses in the frequency of about 50 to about 200 KHz and is an integrated circuit.

* * * * *